US008378710B1

(12) United States Patent
Al-Kadi et al.

(10) Patent No.: US 8,378,710 B1
(45) Date of Patent: Feb. 19, 2013

(54) SECURE DEVICE ANTI-TAMPERING CIRCUIT

(75) Inventors: Ghiath Al-Kadi, Eindhoven (NL); Jan Hoogerbrugge, Helmond (NL); Massimo Ciacci, 's-hertogenBosch (NL)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 13/237,122

(22) Filed: Sep. 20, 2011

(51) Int. Cl.
*H03K 19/003* (2006.01)

(52) U.S. Cl. .................................. 326/8; 326/9; 326/15

(58) Field of Classification Search .................. None
See application file for complete search history.

(56) References Cited

U.S. PATENT DOCUMENTS

| 6,965,977 | B2 | 11/2005 | Yi |
| 7,080,001 | B2 | 7/2006 | Moriyama et al. |
| 7,634,640 | B2 | 12/2009 | Gail et al. |
| 7,889,778 | B2 | 2/2011 | Marinet et al. |
| 7,932,725 | B2 | 4/2011 | Lee |
| 2008/0208497 | A1 | 8/2008 | Bancel et al. |
| 2009/0065592 | A1 | 3/2009 | Pal et al. |
| 2009/0108878 | A1* | 4/2009 | Yamada ........................... 327/39 |
| 2009/0153182 | A1* | 6/2009 | Yamaoka et al. ............... 326/16 |
| 2010/0169671 | A1* | 7/2010 | Coussieu et al. ............... 713/193 |
| 2011/0029828 | A1 | 2/2011 | Bancel et al. |

FOREIGN PATENT DOCUMENTS

EP  2 290 575 A1  3/2011

* cited by examiner

*Primary Examiner* — Anh Tran

(57) ABSTRACT

Various embodiments relate to an anti-tampering circuit for a secure device including: a signal delay detector; a clock delay detector; a clock duty cycle detector; and a protection unit that receives an error indication from the signal delay detector, clock delay detector, and the clock duty cycle detector, wherein the protection unit indicates tampering to a secure device upon receiving the error indication.

20 Claims, 4 Drawing Sheets

SECURE DEVICE ANTI-TAMPERING CIRCUIT

TECHNICAL FIELD

Various exemplary embodiments disclosed herein relate generally to a secure device anti-tampering circuit.

BACKGROUND

Security is an important feature of secure devices. Smart cards are one example of secure devices in wide use. Contactless smart cards appeared several years ago in the form of electronic tags. Today contactless smart cards may be used in the fields of electronic ticketing, transport and access control. More recently they have started to be used for electronic payment transactions.

Both contact and contactless smartcards are vulnerable to security attacks. Security attacks need to be prevented in various secure applications, for example, electronic payment, ePassport, traditional banking, or car security. A smartcard may provide security in the form of a hardware token. Encryption may be used in the smartcard to protect information from unauthorized disclosure. Plain text may be turned into cipher text via an encryption algorithm, and then decrypted back into plain text using the same method. In this way, the actual data exchange channel between smart card and reader may not be 'in the clear', and therefore may not be readable by an unauthorized third party or eavesdropper.

The small amount of memory and power available on a smartcard limit the size of the encryption algorithm used on the smartcard. This makes the breach of encryption algorithms a little bit easier. Therefore, there is anti-hacking related art that addresses the encryption part of the communication, but it does not target physical attacks, for example, tapping internal signals in the smartcard where information is not yet encrypted.

SUMMARY

Accordingly, there is a need for a secure device anti-tampering circuit that detects and prevents physical attacks and/or reverse engineering of a secure device such as a smartcard. Provided are embodiments of a secure device anti-tampering circuit that enable secure devices to resist physical attacks.

A brief summary of various exemplary embodiments is presented. Some simplifications and omissions may be made in the following summary, which is intended to highlight and introduce some aspects of the various exemplary embodiments, but not to limit the scope of the invention. Detailed descriptions of a preferred exemplary embodiment adequate to allow those of ordinary skill in the art to make and use the inventive concepts will follow in the later sections.

Various embodiments may also relate to an anti-tampering circuit for a secure device including: a signal delay detector; a clock delay detector; a clock duty cycle detector; and a protection unit that receives an error indication from the signal delay detector, clock delay detector, and the clock duty cycle detector, wherein the protection unit indicates tampering to a secure device upon receiving the error indication.

Various embodiments may also relate to an anti-tampering circuit for a secure device including: a delay unit that delays a signal from a chip wire, wherein the delay causes the signal on the chip wire to be timing critical; a first flip-flop configured to receive a delayed signal from the delay unit and a clock signal; a second flip-flop configured to receive a delayed signal from the delay unit and a delayed clock signal; and an XOR gate configured to receive output data from the first flip-flop and the second flip-flop wherein the XOR gate outputs an error indication if there is a difference between the output data of the first flip-flop and the output data of the second flip-flop.

Various embodiments may also relate to a method for preventing tampering with a secure device including: delaying a signal on a chip wire in the secure device so that the signal on the chip wire becomes timing critical; loading data from the delayed signal in a first flip-flop; loading the data from the delayed signal in a second flip-flop; clocking the first flip-flop; clocking the second flip-flop after clocking the first flip-flop; comparing the clocked outputs from the first flip-flop and the second flip-flop; and outputting an error indication if the outputs from the first and second flip-flops are different.

Various embodiments may also relate to method for preventing tampering with a secure device including: detecting a signal delay on a chip wire; detecting a delay in a clock signal using a low pass filter; detecting a change in shape of a clock signal using a delayed lock loop; and outputting an error indication if a signal delay on a chip wire is detected, a delay in a clock signal is detected, or a change in shape of a clock signal is detected.

BRIEF DESCRIPTION OF THE DRAWINGS

In order to better understand various exemplary embodiments, reference is made to the accompanying drawings wherein.

DETAILED DESCRIPTION

Figure 1:
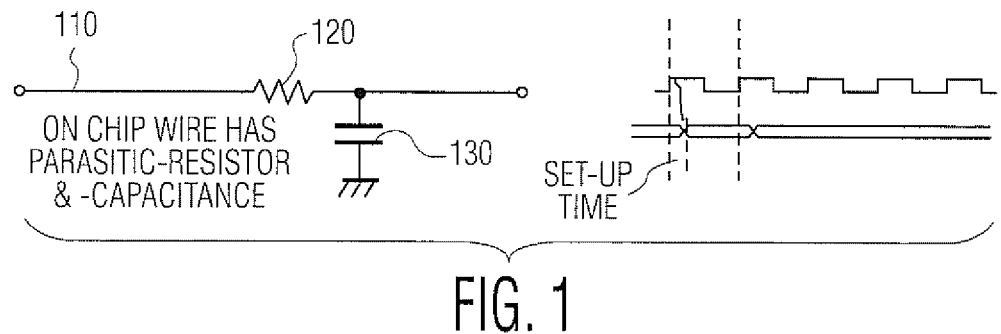
FIG. 1 illustrates the parasitic effects on a signal on a chip wire.

Referring now to the drawings, in which like numerals refer to like components or steps, there are disclosed broad aspects of various exemplary embodiments.

FIG. 1 illustrates the parasitic effects on a signal on a chip wire. A chip wire 110 in a secure device has a parasitic resistance 120 and a parasitic capacitance 130. The parasitic resistance 120 and capacitance 130 form an RC circuit that introduces a delay on a signal carried on the chip wire 110. This delay is shown in the plot in FIG. 1. This delay leads to a setup time that is the time it takes for the signal to reach its desired value.

Figure 2:
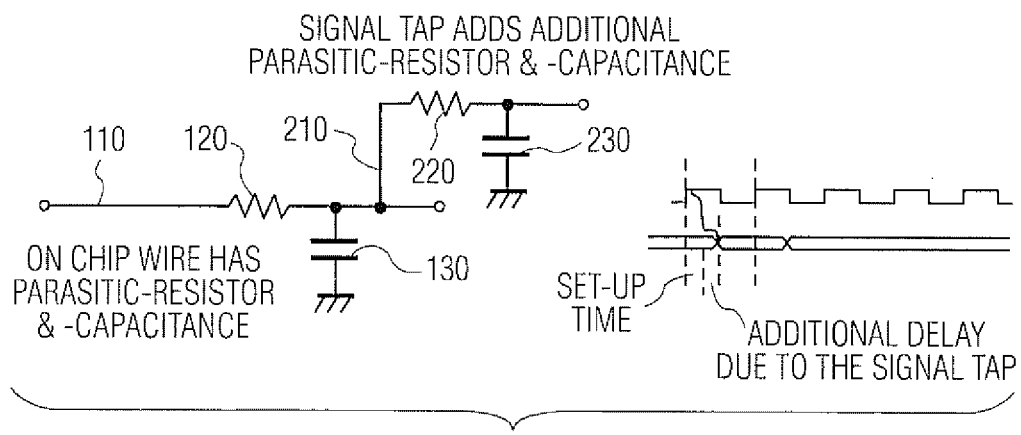
FIG. 2 illustrates the additional parasitic effects of a tap on a signal on a chip wire.

In order to attack the secure device, an eavesdropper may try to tap a chip wire that caries sensitive unencrypted data. FIG. 2 illustrates the parasitic effects of a tap on a signal on a chip wire. The tap 210 includes a parasitic resistance 220 and a parasitic capacitance 230. The parasitic resistance 220 and capacitance 230 form an RC circuit that introduces a delay on a signal carried on the chip wire 210. This delay is in addition to the delay caused by the parasitic resistance 120 and capacitance 130 of the chip wire 110. These delays are shown in the plot in FIG. 2.

Figure 3:
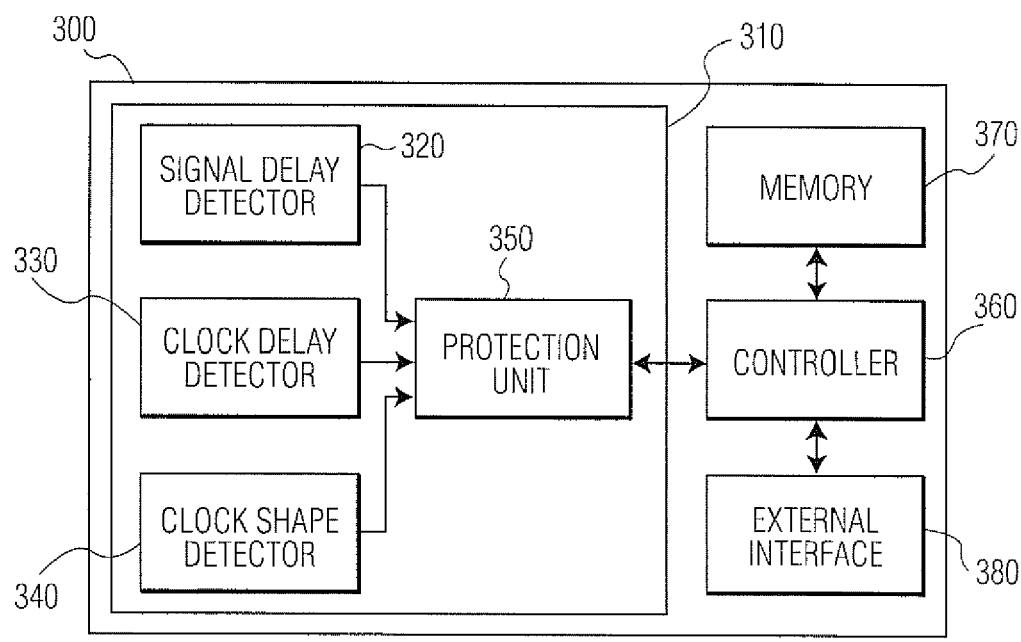
FIG. 3 illustrates a block diagram of an embodiment of a secure device anti-tampering circuit.

FIG. 3 illustrates a block diagram of a secure device including an embodiment of a secure device anti-tampering circuit. The secure device 300 may include an anti-tampering circuit 310, a controller 360, a memory 370, and an external interface 380. The anti-tampering circuit 310 may detect various types of tampering with the secure device. The controller 360 controls the overall operation of the secure device 300 and may include any standard type of controller, processor, etc. used in secure devices 300. Further, the controller 360 may carry out cryptographic functions. The memory 370 communicates with the controller 360. The memory may include identification and other information. Typically, the memory 370 in a secure device will have various safeguards to prevent unauthorized access to the information contained in the memory 370. The data stored in the memory 370 may be encrypted or unencrypted data. Further, cryptographic keys may be stored in the memory 370 as well. The external interface 380 may allow communication with devices external to the secure device 300. The external interface 380 may be either a contact or contactless interface.

The anti-tampering circuit 310 may include a signal delay detector 320, a clock delay detector 330, a clock duty cycle detector 340, and a protection unit 350. The anti-tampering circuit 310 may determine if the secure device 300 has been tampered with, and if so may notify the controller 360 so that the controller may take action to prevent the tampering. Such actions may include, resetting the secure device 300, suspending operation of the secure device 300, or deleting cryptographic keys.

As described above with respect to FIGS. 1 and 2, parasitic resistance and capacitance on a chip wire 110 may cause a delay in the signal. Typically the design of the circuit takes into account the delays that may be caused by the parasitic effects on the chip line 110. If the delay of the signal on the chip wire 110 becomes too great, then a setup timing error occurs. Therefore, a delay may be intentionally added to the signal on the chip wire so that it just avoids a setup timing error. In this situation, if the chip wire 110 is tapped, then the additional delay due to the parasitic effect of the tap will cause a setup timing error. Thus, the presence of a tap on the chip wire 110 may be detected.

Figure 4:
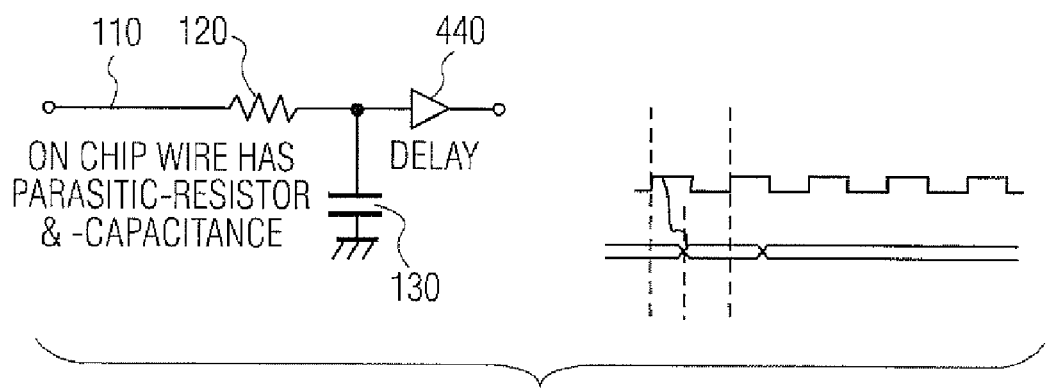
FIG. 4 illustrates the parasitic effects and a delay element on a signal on a chip wire.

FIG. 4 illustrates the delay due to parasitic effects and a delay element on a signal on a chip wire. A delay element 440 may be placed on the chip wire 110 to add an additional amount of delay so that the signal one the chip wire 110 just meets the setup timing requirements during normal operation. This is illustrated in the plot in FIG. 4.

Figure 5:
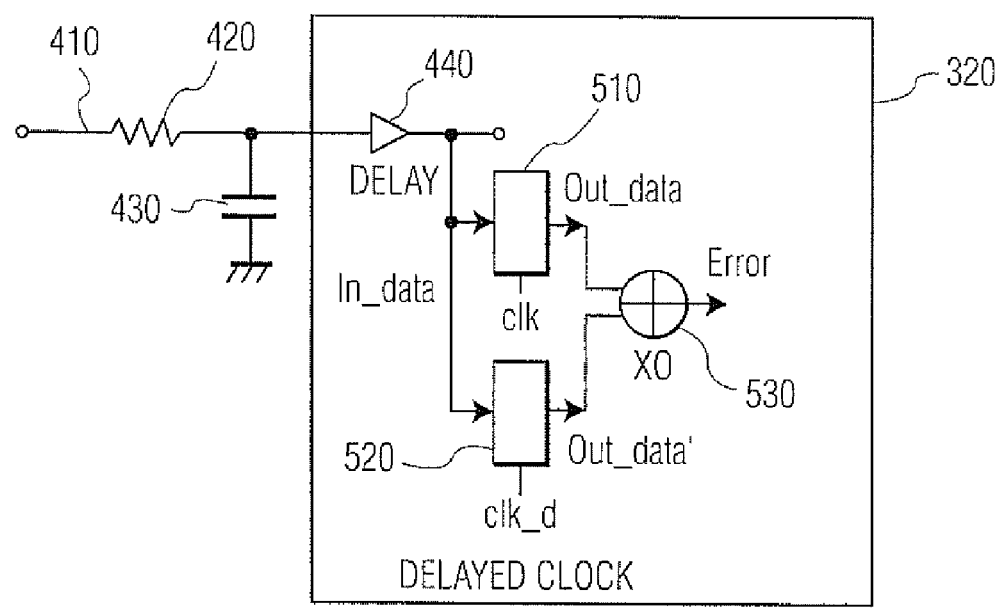
FIG. 5 illustrates an embodiment of a signal delay detector.

FIG. 5 illustrates an embodiment of a signal delay detector. The signal delay detector 320 may include a delay element 440, a first flip-flop 510, a second flip-flop 520, and XOR gate 530. The first flip-flop 510 may receive a delayed input signal from the delay unit 440 and a clock signal clk. The clock signal clk may trigger the operation of the first flip-flop 510. The second flip-flop 520 may also receive the delayed input signal from the delay unit 440 and a delayed clock signal clk_d. The delayed clock signal clk_d may trigger the operation of the second flip-flop 520. The delayed clock signal clk_d may cause the output of the second flip-flop 520 to be delayed relative to the output of the first flip-flop 510. The XOR gate 530 may receive the outputs of the first flip-flop 510 and the second flip-flop 520. The XOR gate 530 may produce an output that indicates whether the outputs of the first and second flip-flops 510, 520 are the same or different.

Figure 6:
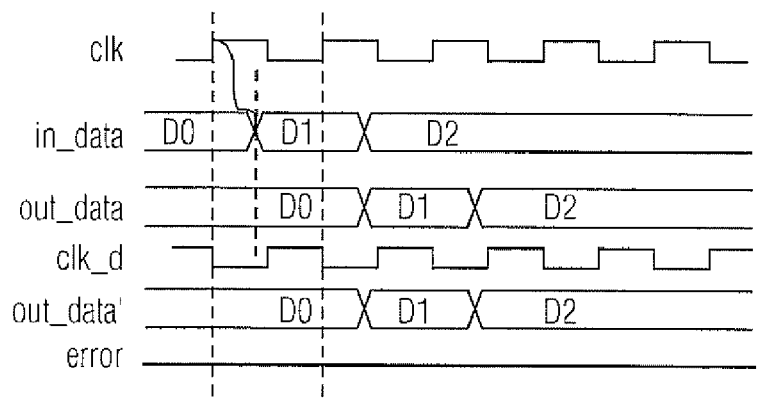
FIG. 6 illustrates a timing diagram showing the operation of the signal delay detector in normal operation.

The operation of the signal delay detector 320 will be explained using FIGS. 5 and 6. FIG. 6 illustrates a timing diagram showing the operation of the signal delay detector in normal operation. The first flip-flop 510 may be by design timing critical. So for correct execution, the signal may need to be available within a certain limited timing window. The second flip-flop 520 that is triggered with delayed clock clk_d may be by design timing tolerant.

Accordingly, the input signal including data D1 may be simultaneously input to both the first flip-flop 510 and the second flip-flop 520 as shown in FIG. 6. Due to the delay that may be inserted by the delay element 440, the data D1 may arrive at the input of the first flip-flop 510 just within the allowed setup timing requirement. The data D1 may then be available on the output of the first flip-flop 510 in the next cycle. Simultaneously, the input data D1 may arrive at the input of the second flip-flop 520. Because the second flip-flop 520 may be triggered with the delayed clock clk_d, the input data D1 may arrive within the allowed setup timing requirement of the second flip-flop, and the data D1 may be available at the output of the second flip-flop 520.

The outputs from the first flip-flop 510 and the second flip-flop 520 may be received by the XOR gate 530. The XOR gate 530 may compare the two outputs, if there is no difference, the output of the XOR gate 530 may be low. Of course the logic of the XOR gate 530 may be inverted as well so that if there is no difference, the output of the XOR gate 530 may be high. Also, the evaluation of the output of the XOR gate 530 may occur only when the delayed clock clk_d is high.

Figure 7:
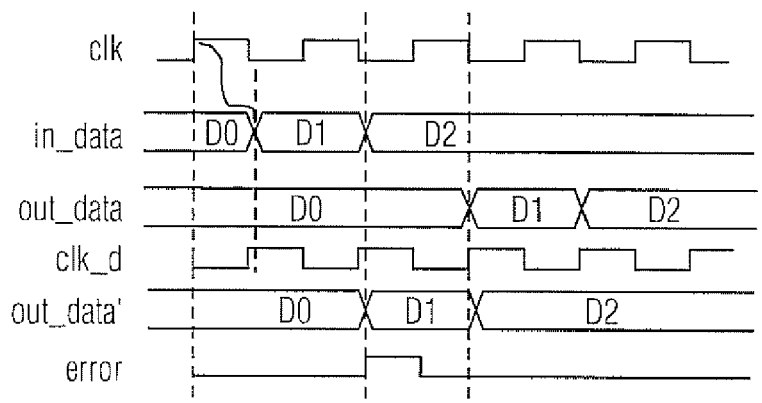
FIG. 7 illustrates a timing diagram showing the operation of the signal delay detector when a tap is present on the chip wire.

FIG. 7 illustrates a timing diagram showing the operation of the signal delay detector when a tap is present on the chip wire 110. The input signal including input data D1 may be delayed beyond the allowed setup timing requirement due to the signal tap. Accordingly, the first flip-flop 510 may miss the timing deadline and may delay its output of data D1 to the next cycle. Because the second flip-flop 520 may be time tolerant, the second flip-flop 520 may receive the input data D1 on time, and therefore, the data D1 may be is still output as expected, resulting in difference in the outputs of the first flip-flop 510 and the second flip-flop 530. This difference may be determined by the XOR gate 530, and the XOR gate 530 may set an error flag. The error flag may indicate an unwanted activity. As a result, the controller 360 may reset the secure device 300, suspend operation of the secure device 300, or delete cryptographic keys.

During the design of the secure device 300, various chip wires may be identified as needing protection from eavesdroppers. Accordingly, signal delay detectors 320 may be placed on these identified chip wires.

The signal delay detector 320 may work only if the eavesdropper does not tap the input clock signal as well or slows the clock, which may make the design more delay tolerant allowing signal tapping. The clock delay detector 330 and the clock duty cycle detector 340 may be used to protect against this sort of attack.

Figure 8:
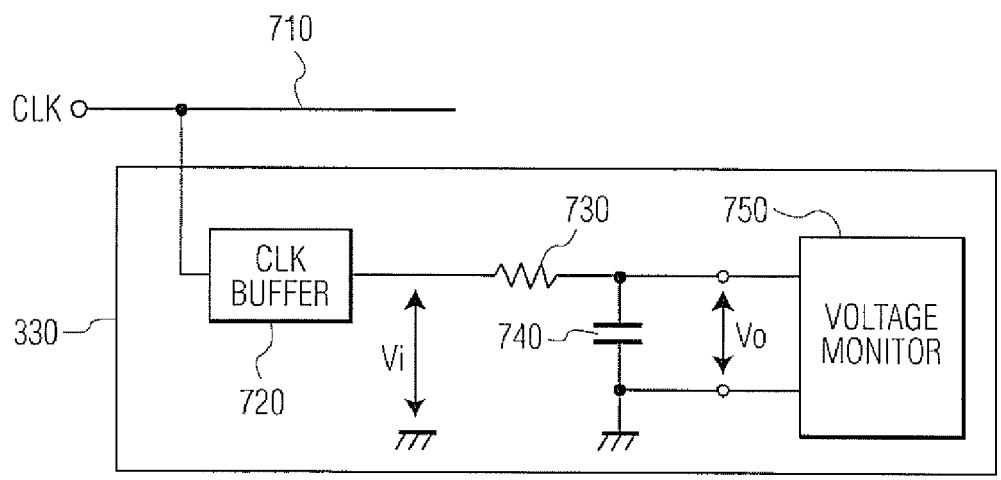
FIG. 8 illustrates a clock delay detector.

The clock delay detector 330 may measure the desired clock duty cycle and detect any frequency fluctuation beyond the allowed variation. This may be accomplished using an analog low pass filter inserted into the clock tree network. FIG. 8 illustrates a clock delay detector 330. The clock delay detector 330 may include a clock buffer 720, a resistor 730, a capacitor 740, and a voltage monitor 750. The resistor 730 and capacitor 740 form a low pass filter.

Figure 9:
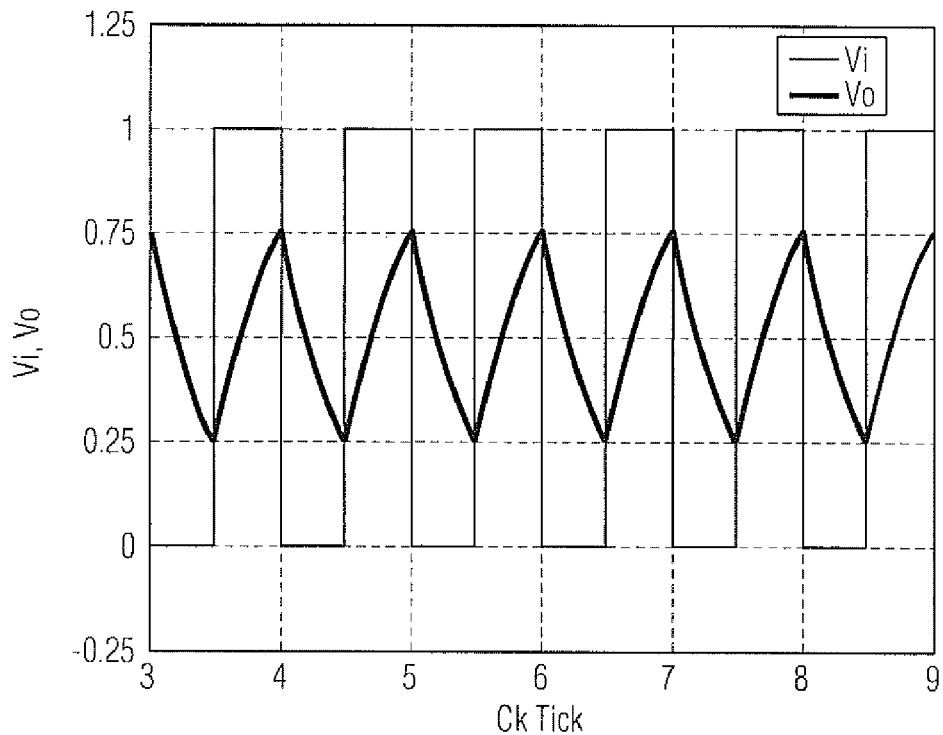
FIG. 9 illustrates the output of the clock delay detector during normal operation.

The low pass filter components, resistance R and capacitance C, may be selected to produce a voltage variation that is one half of the input voltage variation, that is, V output peak-to-peak (Vopp)=½ V input peak-to-peak (Vipp). This may be accomplished by applying the following formula: $T_{ck}=2((R*C)*(-\ln(\frac{2}{3})))$, where $T_{ck}$ is the clock period. The output of the low pass filter may then result in a Vopp=½ Vipp. This is shown in FIG. 9. The voltage monitor 750 may monitor Vopp and compare it to a threshold that is equal to the ½ Vipp+several % for the allowed frequency variation tolerance. If Vopp exceeds the threshold, then the voltage monitor 750 may output an error signal to the protection unit 350.

Figure 10:
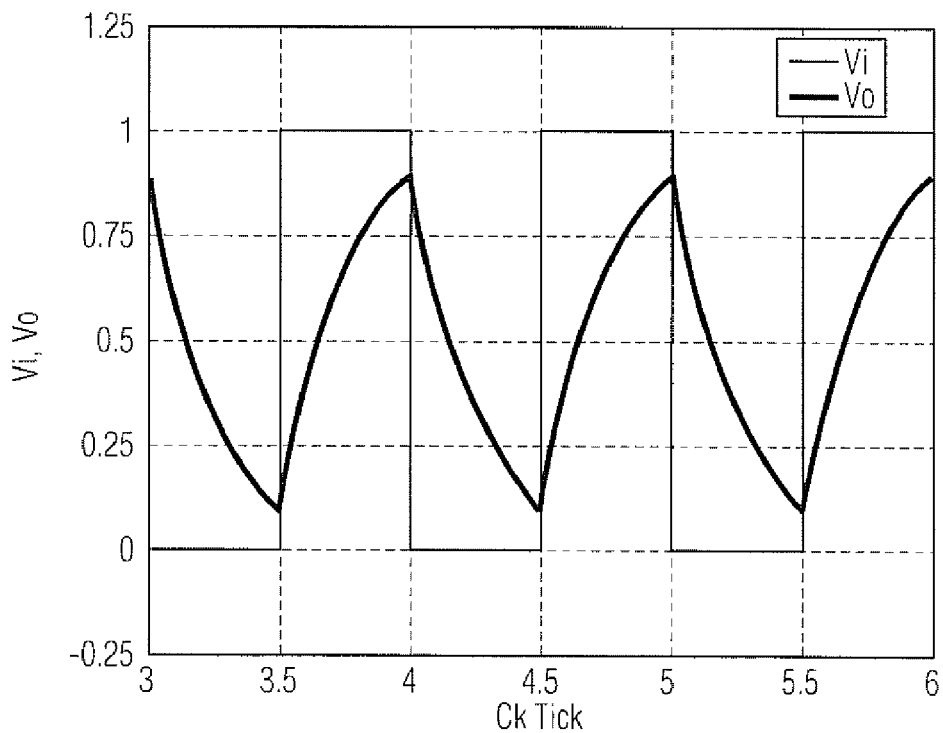
FIG. 10 illustrates the output of the clock delay detector when the clock is delayed.

If an eavesdropper delays the clock, then the Vopp will increase. FIG. 10 illustrates the output of the clock delay detector 330 when the clock is delayed. If the eavesdropper lowers the clock frequency of the smartcard, such that the period is twice the original period, Vopp may increase such that Vopp>(½*Vipp+several %). Accordingly, the voltage monitor 750 may detect that the threshold has been exceeded and may output an error signal to the protection unit 350.

When the clock is tapped, the shape of Vopp may change due to an extra low pass filtering as discussed above with respect to chip wires. The clock duty cycle detector 340 may detect this difference in shape and signal an error if there is a variation. The clock duty cycle detector 340 may use a delay lock loop to compare the input clock with the clock that has been used in the digital design. If this comparison (e.g., by thresholding the difference between the time aligned clock signals) shows that the waveforms are not the same, then the clock duty cycle detector 340 may output an error signal to the protection unit 350.

The secure device 300 may include only the signal delay detector 320 to identify attacks to the secure device 300. In other embodiments, the secure device may additionally include either the clock delay detector 330 or the clock duty cycle detector 340 or both. Also, the secure device 300 may include multiple signal delay detectors 320 to detect delays on multiple different chip wires in the secure device 300. Also, the secure device 300 may include multiple signal delay detectors 320 and clock duty cycle detectors 340 to identify attacks on various clock wires in the secure device 300. Further, the secure device may be a smart card, RFID tag, a NFC system, or any other secure device that needs to resist attacks.

It should be appreciated by those skilled in the art that any block diagrams herein represent conceptual views of illustrative circuitry embodying the principles of the invention. Similarly, it will be appreciated that any state transition diagrams, and the like represent various processes which may be substantially represented in machine readable media and so executed by a computer or processor, whether or not such computer or processor is explicitly shown.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications can be affected while remaining within the spirit and scope of the invention. Accordingly, the foregoing disclosure, description, and figures are for illustrative purposes only and do not in any way limit the invention, which is defined only by the claims.

We claim:

1. An anti-tampering circuit for a secure device comprising:
   a signal delay detector;
   a clock delay detector;
   a clock duty cycle detector; and
   a protection unit that receives an error indication from the signal delay detector, clock delay detector, and the clock duty cycle detector, wherein the protection unit indicates tampering to a secure device upon receiving the error indication.

2. The anti-tampering circuit of claim 1, wherein the signal delay detector further comprises:
   a delay unit that delays a signal from a chip wire, wherein the delay causes the signal on the chip wire to be timing critical;
   a first flip-flop configured to receive a delayed signal from the delay unit and a clock signal;
   a second flip-flop configured to receive a delayed signal from the delay unit and a delayed clock signal; and
   an XOR gate configured to receive output data from the first flip-flop and the second flip-flop wherein the XOR gate outputs an error indication if there is a difference between the output data of the first flip-flop and the output data of the second flip-flop.

3. The anti-tampering circuit of claim 1, wherein the clock delay detector further comprises a low pass filter and a voltage monitor.

4. The anti-tampering circuit of claim 3, wherein the voltage monitor compares the peak to peak voltage of an output from the low pass filter to a threshold.

5. The anti-tampering circuit of claim 1, wherein the clock duty cycle detector further comprises a delay lock loop.

6. An anti-tampering circuit for a secure device comprising:
   a delay unit that delays a signal from a chip wire, wherein the delay causes the signal on the chip wire to be timing critical;
   a first flip-flop configured to receive a delayed signal from the delay unit and a clock signal;
   a second flip-flop configured to receive a delayed signal from the delay unit and a delayed clock signal; and
   an XOR gate configured to receive output data from the first flip-flop and the second flip-flop wherein the XOR gate outputs an error indication if there is a difference between the output data of the first flip-flop and the output data of the second flip-flop.

7. The anti-tampering circuit of claim 6, further comprising a clock delay detector.

8. The anti-tampering circuit of claim 7, further comprising a clock duty cycle detector.

9. The anti-tampering circuit of claim 7, wherein the clock delay detector, further comprises a low pass filter and a voltage monitor.

10. The anti-tampering circuit of claim 9, wherein the voltage monitor compares the peak to peak voltage of an output from the low pass filter to a threshold.

11. The anti-tampering circuit of claim 8, wherein the clock duty cycle detector further comprises a delay lock loop.

12. A method for preventing tampering with a secure device comprising:
   delaying a signal on a chip wire in the secure device so that the signal on the chip wire becomes timing critical;
   loading data from the delayed signal in a first flip-flop;
   loading the data from the delayed signal in a second flip-flop;
   clocking the first flip-flop;
   clocking the second flip-flop after clocking the first flip-flop;
   comparing the clocked outputs from the first flip-flop and the second flip-flop; and
   outputting an error indication if the outputs from the first and second flip-flops are different.

13. The method of claim 12, further comprising resetting the secure device, suspending operation of the secure device, or deleting cryptographic keys if an error indication is output.

14. The method of claim 12, further comprising:
low pass filtering a clock signal;
monitoring the peak to peak voltage of the low pass filtered clock signal; and
outputting an error indication if the peak to peak voltage exceeds a predetermined threshold.

15. The method of claim 14, further comprising:
comparing a clock signal with a predetermined signal characteristic using a delay lock loop to determine if a difference between the clock signal and a predetermined signal characteristic exceeds a predetermined threshold; and
outputting an error indication if the difference exceeds the predetermined threshold.

16. The method of claim 12, wherein delaying a signal on a chip wire includes delaying the signal based upon setup timing requirements.

17. A method for preventing tampering with a secure device comprising:
detecting a signal delay on a chip wire;
detecting a delay in a clock signal using a low pass filter;
detecting a change in shape of a clock signal using a delayed lock loop; and
outputting an error indication if a signal delay on a chip wire is detected, a delay in a clock signal is detected, or a change in shape of a clock signal is detected.

18. The method of claim 17, wherein detecting a delay in a clock signal further includes monitoring the peak to peak voltage of the low pass filtered clock signal.

19. The method of claim 17, further comprising resetting the secure device, suspending operation of the secure device, or deleting cryptographic keys if an error indication is output.

20. The method of claim 17, wherein detecting a signal delay on a chip wire further includes:
delaying a signal on a chip wire in the secure device so that the signal on the chip wire becomes timing critical;
loading data from the delayed signal in a first flip-flop;
loading the data from the delayed signal in a second flip-flop;
clocking the first flip-flop;
clocking the second flip-flop after clocking the first flip-flop; and
comparing the clocked outputs from the first flip-flop and the second flip-flop.

\* \* \* \* \*